United States Patent [19]
Mangold et al.

[11] Patent Number: 6,157,520
[45] Date of Patent: Dec. 5, 2000

[54] DISC DRIVE HEAD SUSPENSION WITH GIMBAL CONTACT FEATURE FOR RAMP LOAD/UNLOAD

[75] Inventors: Markus Erwin Mangold, Eden Prairie; Roger Alan Resh, Prior Lake; Peter Crane, Richfield, all of Minn.

[73] Assignee: Seagate Technology LLC, Scotts Valley, Calif.

[21] Appl. No.: 09/280,299

[22] Filed: Mar. 29, 1999

Related U.S. Application Data

[60] Provisional application No. 60/079,885, Mar. 30, 1998.
[51] Int. Cl.$^7$ ........................................... G11B 5/54
[52] U.S. Cl. .................... 360/255; 360/254.8; 360/245.3
[58] Field of Search .................. 360/255, 245.3, 360/254.7, 255.5, 255.6, 255.9

[56] References Cited

U.S. PATENT DOCUMENTS 5,291,359  3/1994  Wolter ..................................... 360/255
5,719,727  2/1998  Budde ..................................... 360/255

*Primary Examiner*—Robert S. Tupper
*Attorney, Agent, or Firm*—Edward P. Heller, III

[57] ABSTRACT

A system for unloading heads from and loading heads into cooperative engagement with discs in a disc drive, including a novel head suspension for mounting and supporting the heads. The head suspension includes a primary ramp contact feature formed as a portion of the load beam portion of the head suspension and a secondary ramp contact feature formed as an extension of the mounting tab of the gimbal portion of the head suspension. The primary ramp contact feature acts as the principal lifting mechanism of the head suspension, while the secondary ramp contact feature serves to controllably lift the head. In an alternative embodiment, only the secondary ramp contact feature is used for the unloading and loading of the head.

7 Claims, 8 Drawing Sheets

DISC DRIVE HEAD SUSPENSION WITH GIMBAL CONTACT FEATURE FOR RAMP LOAD/UNLOAD

CROSS-REFERENCE TO RELATED APPLICATION

This application claims priority to U.S. Provisional Application Ser. No. 60/079,885, filed Mar. 30, 1998.

FIELD OF THE INVENTION

This invention relates generally to the field of rigid disc drives, and more particularly, but not by way of limitation, to a head suspension for a disc drive that includes a novel contact feature that facilitates the ramp loading and unloading of the heads away from and into operative relationship with the discs in the disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, $-5°$ C. to $60°$ C., and further be specified to be capable of withstanding operating mechanical shocks of 100 G or greater without becoming inoperable. Moreover, future disc drive products are being developed which must be capable of withstanding non-operating shocks of up to 1000 G without suffering fatal damage.

One of the undesirable possible consequences of mechanical shocks applied to a disc drive is the phenomenon commonly referred to in the industry as "head slap". This condition occurs when the applied mechanical shock is large enough to overcome the load force applied to the head assembly by the head suspension. Under such conditions, the head assembly lifts away from the disc surface, and when the shock event terminates, the head assembly moves back into contact with the disc in an uncontrolled manner, potentially causing damage to the head assembly, disc or both.

One common preventive measure used in the industry to prevent head slap is to use ramps closely adjacent the outer diameter of the discs to unload the heads from engagement with the discs when a non-operating condition, such as loss of disc drive power, is detected. Since the heads are no longer resting on the disc surface, applied mechanical shocks cannot cause uncontrolled contact between the heads and discs. Once proper operational conditions are restored, the head assemblies are reloaded into engagement with the discs for normal disc drive operation.

In order to ramp load/unload the head assemblies, the head suspensions which support the head assemblies must include some sort of ramp contact feature to cooperate with the ramps, and these ramp contact features can be divided into two general groups: 1) ramp contact features located adjacent the leading edge of the head assembly, i.e., between the actuator pivot point and the head assembly; and 2) ramp contact features located adjacent the trailing edge of the head assembly, i.e., at the far distal end of the head suspension.

Head suspensions that include ramp contact features from the first group have the advantages of low mass and inertia during actuator seeks, high modal frequencies, good operating shock characteristics and simple access to the bonding pads used for electrical connection of the head transducers. The prior art use of this type of ramp contact feature does, however, have the disadvantages of requiring a parabolic ramp surface to ensure point contact between the ramp surfaces and the ramp contact features and insufficient clearance between the ramp contact feature and the disc surface to allow for assembly tolerances in a multi-disc disc drive assembly. Co-pending U.S. patent application Ser. No. 09/215,428, filed Dec. 18, 1998, assigned to the assignee of the present invention, discloses a novel arrangement of ramp contact features which overcomes these disadvantages, and the present invention will be discussed in detail hereinbelow as it can be utilized with such a head suspension assembly.

Head suspension assemblies that include ramp contact features from the second group have the advantages of allowing for flexibility of design of the contact features to allow for sufficient spacing between the disc surface and the ramp contact features, and the capability of having the ramp contact feature located on the head suspension centerline to limit static attitude biases on the gimbal of the head suspension. However, such assemblies typically introduce unwanted mass and inertia during seek operations, have less desirable modal frequencies, less desirable operating shock characteristics and greatly restricted access to the head assembly electrical bonding pads.

The ramp contact features of the prior art are typically formed as elements of the relatively robust rigid beam portion of the head suspension assembly. When contact is established between the ramp contact features on the rigid beam portion of the head suspension assembly and the ramp surfaces, the lifting force is thus not directly applied to the relatively flexible gimbal portion of the head suspension assembly to which the heads are attached. Therefore, the mass of the heads is solely supported by the gimbal portion of the head suspension assembly when the heads are unloaded from cooperative engagement with the discs.

Prior art heads commonly included slider bodies of a type known as "positive pressure air bearing sliders" (PPABS). Such PPABS heads included air bearing surfaces which interact with a thin layer of air dragged along by the spinning discs to generate a hydrodynamic lifting force which tended to separate the heads from the disc surface. This lifting tendency was counterbalanced by forming a spring portion of the head suspension assembly to generate a balancing "load force" in a direction opposite to the hydrodynamic lifting force. The "flying height" of the heads was thus determined by the relative strengths of the hydrodynamic lifting force and the head suspension load force.

Recent industry demands for increased areal density of the recorded data on discs have, in turn, required that the heads be flown in greater proximity to the disc surfaces, with heads of the current generation utilizing flying heights of 1.0 $\mu$" (0.000001 inch) or less. With such small flying heights, manufacturing tolerances in the head suspension assemblies lead to increasing difficulties in balancing the hydrodynamic lifting force of the head slider with the load force of the head suspension assembly to the necessary tolerance levels.

The requirement of lowered flying heights with more stringent tolerance needs has lead to the development of a new type of slider body for mounting the transducers used to record and retrieve data on the disc surface. This new type of slider body includes "negative pressure air bearing surfaces" (NPABS). As the name suggests, NPABS sliders include features that not only generate a hydrodynamic lifting force at the air bearing surfaces, but also include specially configured features that generate balancing low pressure, or "negative pressure", areas which tend to draw the head closer to the disc. Proper design of the slider body thus permits implementation of heads in which the hydrodynamic lifting force is balanced against the negative pressure created by the air bearing configuration to create slider bodies which are "self-balancing" and fly with great stability at a desired flying height. Since the balance of upward and downward forces exerted on the head is a function of the more easily controlled dimensions and features of the slider body itself, rather than the slider body and spring portion of the head suspension, variation of flying height from head to head can also be maintained within the more stringent tolerance ranges.

Solving the problem of head flying height through the use of NPABS sliders does, however, create a new engineering challenge related to ramp unloading and loading of the heads.

Since NPABS heads exert a downward (i.e., toward the disc surface) force in operation, a correspondingly greater force must be exerted to lift the heads away from the discs during head unloading, leading to potentially fatal stressing of the delicate gimbal portion of the head suspension if the lifting is accomplished by contact between the ramps and the load beam portions of the head suspension assemblies.

A need clearly exists, therefore, for a head/head suspension assembly which incorporates a NPABS slider assembly—for stability and consistency of flying height—with a ramp contact system which does not exert potentially damaging forces on the delicate gimbal portion of the head suspension during head unload operations.

SUMMARY OF THE INVENTION

The present invention is a system for unloading heads from and loading heads into cooperative engagement with discs in a disc drive, including a novel head suspension for mounting and supporting the heads. The head suspension includes a primary ramp contact feature formed as a portion of the load beam portion of the head suspension and a secondary ramp contact feature formed as an extension of the mounting tab of the gimbal portion of the head suspension. The primary ramp contact feature acts as the principal lifting mechanism of the head suspension, while the secondary ramp contact feature serves to controllably lift the head. In an alternative embodiment, only the secondary ramp contact feature is used for the unloading and loading of the head.

It is an object of the present invention to provide a head suspension assembly for a disc drive.

It is another object of the invention to provide a head suspension assembly that includes a primary ramp contact feature for facilitating ramp loading and unloading of the head assembly and a secondary ramp contact feature for controlling the relative displacement of the rigid beam and gimbal portions of the head suspension assembly.

These and other features and advantages of the present invention can best be understood from the following Detailed Description of the Invention, when read in conjunction with an examination of the accompanying drawings.

DETAILED DESCRIPTION OF THE INVENTION

Figure 1:
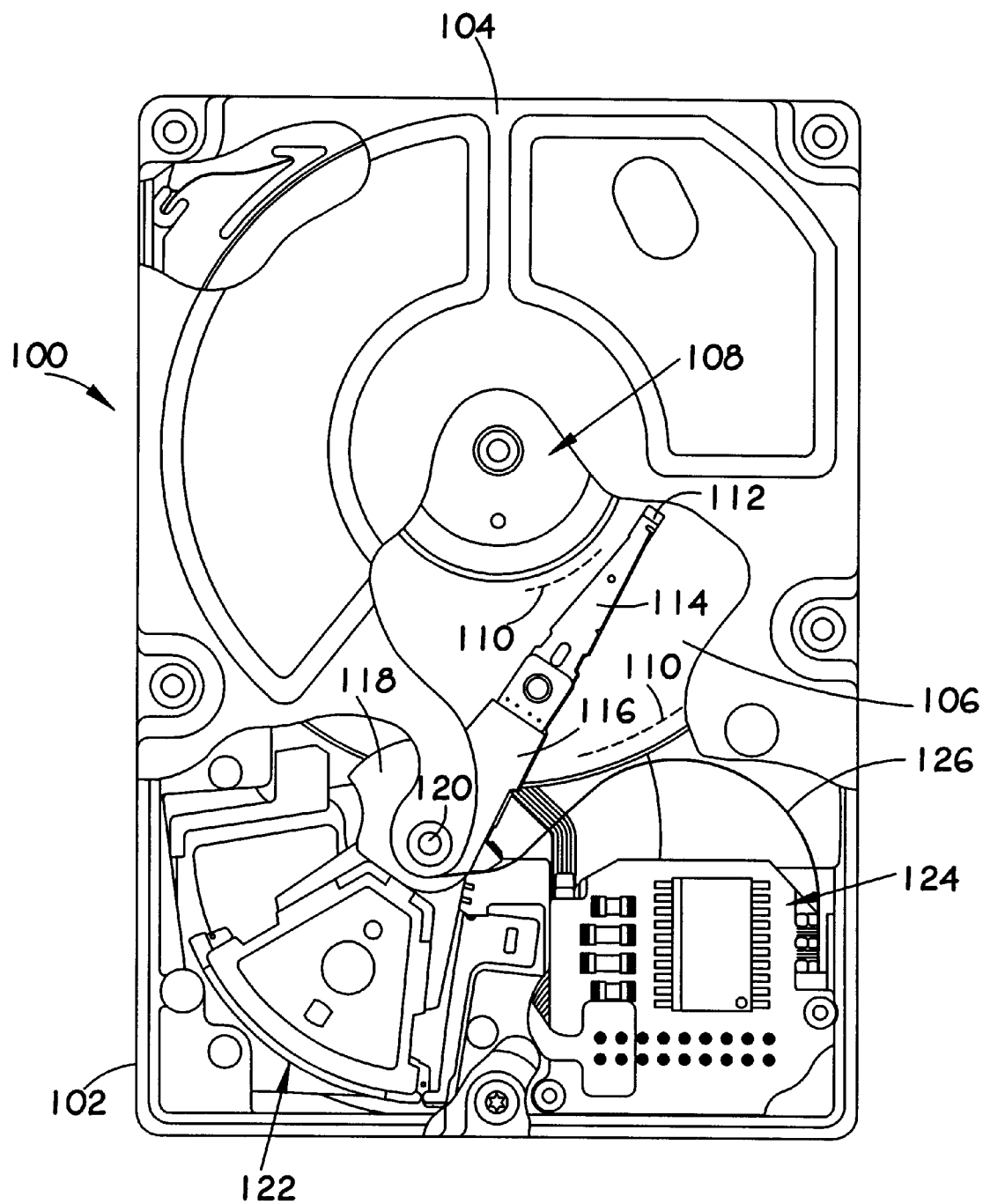
FIG. 1 is a plan view of a disc drive in which the present invention is particularly useful.

Turning now to the drawings and specifically to FIG. 1, shown is a plan view of a prior art disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes one or more discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry. Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry and the moving actuator assembly via a flexible printed circuit cable (PCC) 126.

The prior art disc drive 100 of FIG. 1 is of the type referred to in the industry as a "contact start-stop" drive. That is, when power to the disc drive 100 is removed, the head assemblies 112 are moved to a park position near the inner diameter of the discs 106, as shown in the figure, and the actuator assembly is latched at this park position. As the discs 106 cease to spin, the head assemblies 112 come to rest in contact with the surfaces of the discs 106, and remain in contact with the discs 106 until such time as power is restored to the disc drive 100. As part of the start-up sequence which the disc drive executes upon restoration of power, the spindle motor 108 is accelerated to its operational speed while the actuator remains latched at the park position. Once the spindle motor 108 reaches sufficient speed to fly the head assemblies 112, the actuator is unlatched, and the remainder of the start-up initialization is executed.

The recently implemented small head assemblies 112 require that the head suspensions 114 exert only a small amount of load force to the head assemblies 112 in order to maintain the head assemblies 112 in their desired operational relationship to the discs 106. This small load force is advantageous during the contact start-stop operations described immediately above, since the small load force minimizes the possibility of frictionally-induced damage to the head assemblies 112 and discs 106 during the short time interval when the discs 106 are spinning at speeds too slow to fly the head assemblies 112.

However, as noted above, disc drives of the current generation are commonly specified to be able to withstand the application of mechanical shocks on the order of 1000 G during non-operational conditions. With this requirement, the small amount of load force applied to the head assemblies 112 is a detriment, since it lowers the amount of mechanical shock that can be applied to the disc drive without lifting the head assemblies 112 away from the surfaces of the discs 106, resulting in head slap and potential damage to the head assemblies 112, the discs 106 or both.

One typical approach to prevention of head slap in disc drives involves the use of ramp structures located closely adjacent the outer diameter of the discs. The implementation of ramp structures involves the inclusion of head suspension assemblies having specially formed contact features. When a non-operation condition, such as a power loss or "sleep" condition is sensed by the disc drive, the actuator moves the head assemblies toward the outer diameters of the discs. As the heads pass outward of the outermost operational data storage area on the discs, the contact features of the head suspensions contact the surfaces of the ramp structure, and, as the actuator continues to move the heads outward, the head assemblies are lifted away from their normal cooperative relationship with the discs. The heads are typically moved outward until they are no longer axially over the discs and are positioned at a predefined park position. The actuator is then latched at this park position until such time as the non-operational condition terminates.

Upon termination of the non-operational condition, the spindle motor accelerates the discs until they reach the operational speed. The actuator is then unlatched, and moves the head assemblies inward toward the discs. As this inward motion occurs, the contact features of the head suspensions travel back down the ramp structures until such time as the heads are reestablished in their operational relationship to the discs, and normal operation of the disc drive is resumed.

Figure 2:
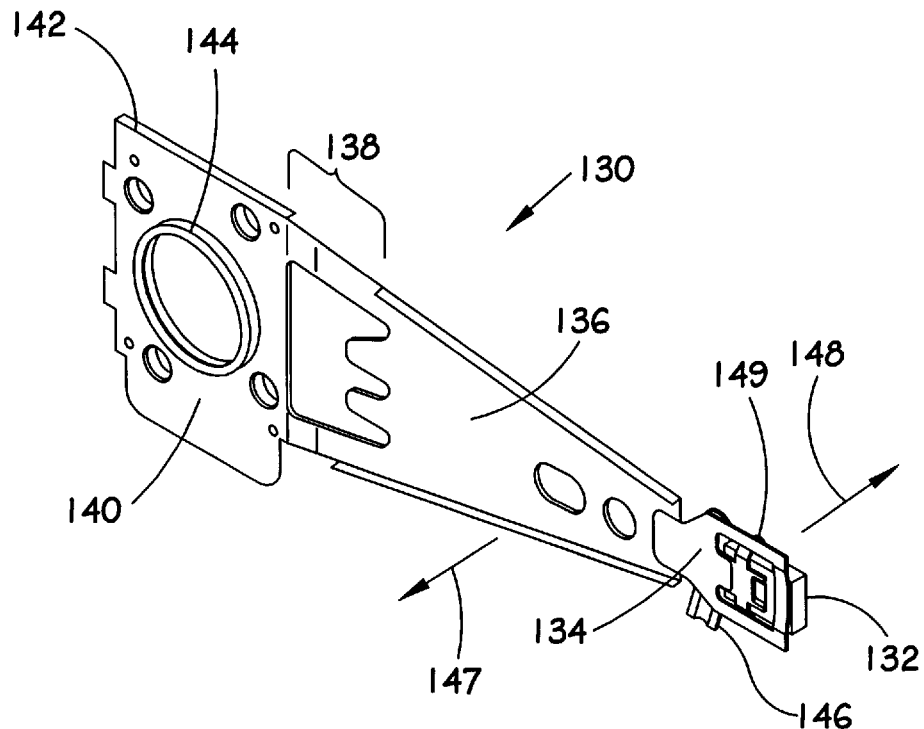
FIG. 2 is a perspective view showing the major components of a prior art head/head suspension assembly.

FIG. 2 is a perspective view of a prior art head/head suspension assembly 130, showing the major components. The head/head suspension assembly 130 includes a head assembly 132, which carries the read/write transducers used to record and retrieve data on the discs. The head assembly 132 is typically adhesively attached to a gimbal 134, which is compliant in the roll and pitch axes of the head assembly 132, and stiff in the yaw and in-plane axes. This compliance allows the head assembly 132 to follow minor surface variations in the disc surface, while the stiff yaw and in-plane characteristics allow for rapid and accurate positioning of the transducers to the data tracks on the discs. The gimbal 134 is typically formed of stainless steel foil on the order of 1.0 milli-inches (0.001 inches) thick.

The gimbal 134 is typically spot welded to a load beam 136 which is formed from relatively robust stainless steel foil with a thickness on the order of 2.0 milli-inches (0.002 inches). The lateral edges of the load beam are commonly formed into channels to provide additional stiffness and to provide a path for the conductors (not shown) which carry electrical signals to and from the transducers on the head assembly 132.

The load beam 136 is typically connected by a spring portion 138 to a mounting portion 140. The mounting portion 140, spring portion 138 and load beam 136 are all formed from the same sheet of stainless steel foil, which, while stronger than the material of the gimbal 134, is still relatively fragile. In order to provide a strong connection of the entire head/head suspension assembly 130 to the actuator head mounting arms (116 in FIG. 1), the mounting portion 140 is typically spot welded to a thick mounting plate 142, which also includes features for facilitating the attachment of the head/head/suspension assembly 130 to the actuator. In the example shown in FIG. 2, the mounting plate 142 includes a swage boss 144 which is mechanically expanded in a cooperative hole in the actuator head mounting arm (116 in FIG. 1) at assembly.

Since, as previously noted, the head assembly 132 acts in a cooperative hydrodynamic relationship with air dragged along by the spinning disc, the head assembly 132 generates a lifting force which tends to separate the head assembly 132 from the disc. This hydrodynamic lifting force is countered by the spring force generated by the forming of the spring portion 138. The countering spring force is passed from the spring portion 138 through the stiff load beam 136 to the head assembly 132 in a manner well known in the industry, and which will be discussed in more detail hereinbelow.

As will be apparent to one of skill in the art, the gimbal portion 134 is fabricated as a separate, discrete component, and is typically laser welded to the load beam portion 136 of the head suspension assembly. In the example embodiment shown, the gimbal portion 134 is attached to the upper side of the load beam portion 136, i.e., the side of the load beam portion 136 away from the disc surface. The head assembly 132 is typically adhesively attached to the gimbal portion 134 at its far distal end, and the gimbal portion 134 is compliant in the roll and pitch axes of the head assembly 132 to allow the head assembly 132 to permit the head assembly to fly in conformance with minor variations of the surface of the discs.

The example head/head suspension assembly 130 shown in FIG. 2 is configured to satisfy the conditions toward which the present invention is directed. That is, the head/head suspension assembly 130 includes ramp contact features 146 which interact with a ramp structure (not shown) to lift the operative elements of the head/head suspension assembly 130 away from the disc, in the direction of arrow 147. This lifting, in particular with the incorporation of negative pressure air bearing surface (NPABS) head assemblies 132, tends to cause the head assembly 132 to be displaced from the load beam portion 136 in the direction of arrow 148. The amount of such displacement is limited in the configuration shown by the presence of gimbal displacement limiting features 149 formed as elements of the load beam portion 136, as will be discussed in more detail below. During normal disc drive operation, there is no direct contact between the gimbal portion 134 and the gimbal displacement limiting features 149. It is only when the head/head suspension assembly 130 is lifted away from the disc that the gimbal displacement limiting features 149 can interact with the gimbal beams (not separately designated) of the gimbal portion 134.

Figure 3:
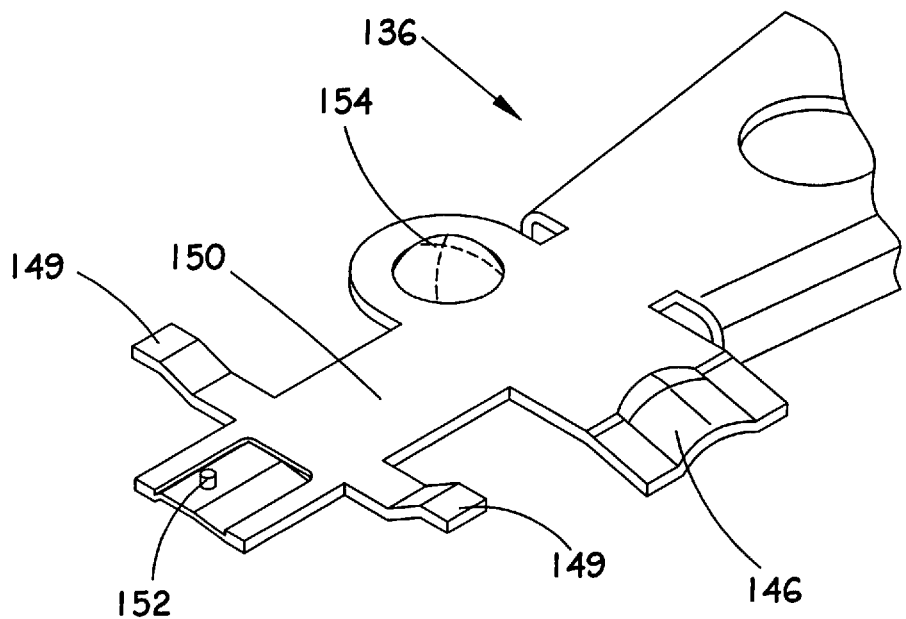
FIG. 3 is a detail perspective view of a load beam component that forms a portion of the prior art head/head suspension assembly of FIG. 2.

FIG. 3 is a detail partial bottom perspective view of the load beam 136 of FIG. 2. In the ensuing discussion, the terms "up", "upper", "top" and related terms will refer to the direction and component elements away from the disc surface, while the terms "down", "lower", "bottom" and related terms will refer to the direction and component elements toward, or facing, the discs.

FIG. 3 shows that the load beam 136 includes a load point tab 150 at its distal end. The load point tab can be seen to include a specially formed load point button 152. The manner in which the load point button 152 and associated features are fabricated using the processes of half-etching and stamp forming can be found in U.S. Pat. No. 5,638,234, issued Jun. 10, 1997, assigned to the assignee of the present invention and incorporated herein by reference. While a particular example of a load point button is shown for illustration, other types of contact points may well be included in the head suspension, including conventional stamped dimples. Therefore, the scope of the present invention is not envisioned as being limited by the particular type of contact point utilized.

The function of the load point button 152 is to provide point-contact for the transfer of the load force generated by the spring portion (138 in FIG. 2) as will be explained in detail hereinbelow.

In FIG. 3, it can also be seen that the load beam 136 includes a ramp contact feature 146, which is a principal element of the previously referenced U.S. patent application Ser. No. 09/215,428. The figure shows that the ramp contract feature 146 is in the form of an inclined semi-cylinder with a spherical end portion formed on a tab (not designated) extending laterally from the load beam 136 near the base of the load point tab 150. One of skill in the art will realize that the direction in which the tab extends from the load beam 136 will be dependent upon whether the head suspension is intended for use with a head assembly on the lower or upper surface of the disc. The manner in which the ramp contact feature interacts with a ramp structure is discussed in detail in the referenced patent.

FIG. 3 also shows an optional secondary contact feature 154 located on a second tab extending laterally from the opposite side of the load beam 136. Again, the function of the secondary contact feature is discussed in detail in the referenced patent.

FIG. 3 also shows in more detail the configuration of the gimbal displacement limiting features 149.

Figure 4:
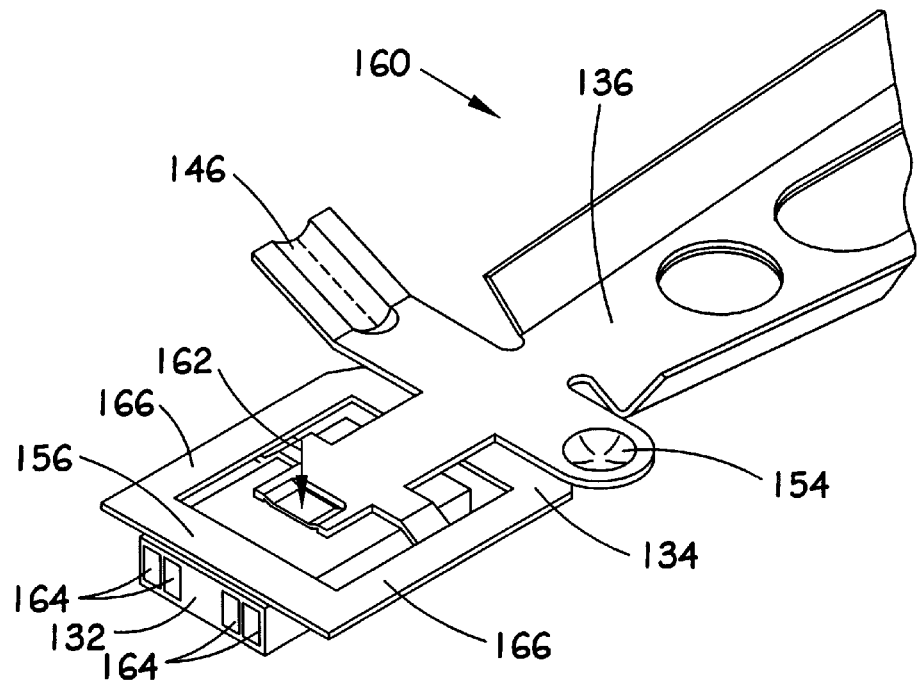
FIG. 4 is a detail perspective view of a variation of a prior art head/head suspension assembly incorporating the load beam component of FIG. 3.

Turning now to FIG. 4, shown is a detail partial perspective view of a head/head suspension assembly 160, such as that of FIG. 2, which includes the ramp contact features 146, 154 described above in regard to FIG. 3. The figure also shows a head assembly 132, a gimbal portion 134 and a load beam 136, as described above with regard to FIGS. 2 and 3.

FIG. 4 shows that the head assembly 132 is adhesively attached to the gimbal 134 at a head mounting portion 156, and the gimbal portion 134 is attached to the lower side of the load beam 136. This configuration brings the top surface of the head assembly 132 into horizontal alignment with the bottom of the load point button (152 in FIG. 3) on the load point tab 150. The load force generated by the spring portion (138 in FIG. 2) of the head suspension 160 is applied to the head assembly 132 near its center, as indicated by arrow 162, at a location specifically selected to fly the head assembly 132 at the desired attitude relative to the disc.

FIG. 4 also shows the electrical terminations 164, or bonding pads, used to attach the fine wires used to carry electrical signals to and from the transducers (not shown) on the head assembly 132. As is evident from the drawing, the present configuration, which places the ramp contact feature 150 between the head assembly 132 and the mounting end of the head suspension 160, facilitates access to both the electrical terminations 164 for ease of electrical assembly, and to the gimbal 134 for any needed mechanical adjustment of the static attitude of the head assembly 132. As previously mentioned above, head suspensions which incorporate ramp contact features located at the far distal end of the head suspension obstruct access to both the electrical terminations and to the gimbal, increasing the difficulty of electrical assembly and adjustment of static head assembly attitude.

The configuration of FIG. 4 also prevents excessive separation of the head assembly 132 from contact with the load beam portion 136 during head unloading. That is, when the ramp contact features 146, 154 interact with a ramp structure to lift the head suspension away from the disc (i.e., upward in the figure), any tendency for the head assembly 132 to remain in cooperative engagement with the disc—as, for instance, due to the inclusion of a NPABS head assembly—is countered by contact between the gimbal displacement limiting features (149 in FIG. 3) and the gimbal beams 166 of the gimbal portion 134, thus ensuring that the head assembly 132 is disengaged from the disc without imposing potentially damaging stresses on the gimbal portion 134 of the head suspension assembly.

While the configuration of FIG. 4 does address the challenge to which the present invention is directed, it does so with the imposition of difficulty of assembly. An examination of FIG. 4 will reveal that, in order for the components to be assembled in the relationships shown, the gimbal portion 134 must be interleaved with various elements of the load beam portion 136. That is, the gimbal beams 166 must be positioned above the gimbal displacement limiting features (149 in FIG. 3), while the portion of the gimbal portion 134 used for attachment to the load beam portion 136 must be aligned with the lower surface of the load beam portion 136. Such interleaving introduces an undesirable complexity—and cost—into the assembly process.

The present invention, as will be described below, accomplishes the goal of limiting the stresses applied to the gimbal portion of the head suspension during head unloading, while eliminating the necessity of interleaving of head suspension components.

Figure 5:
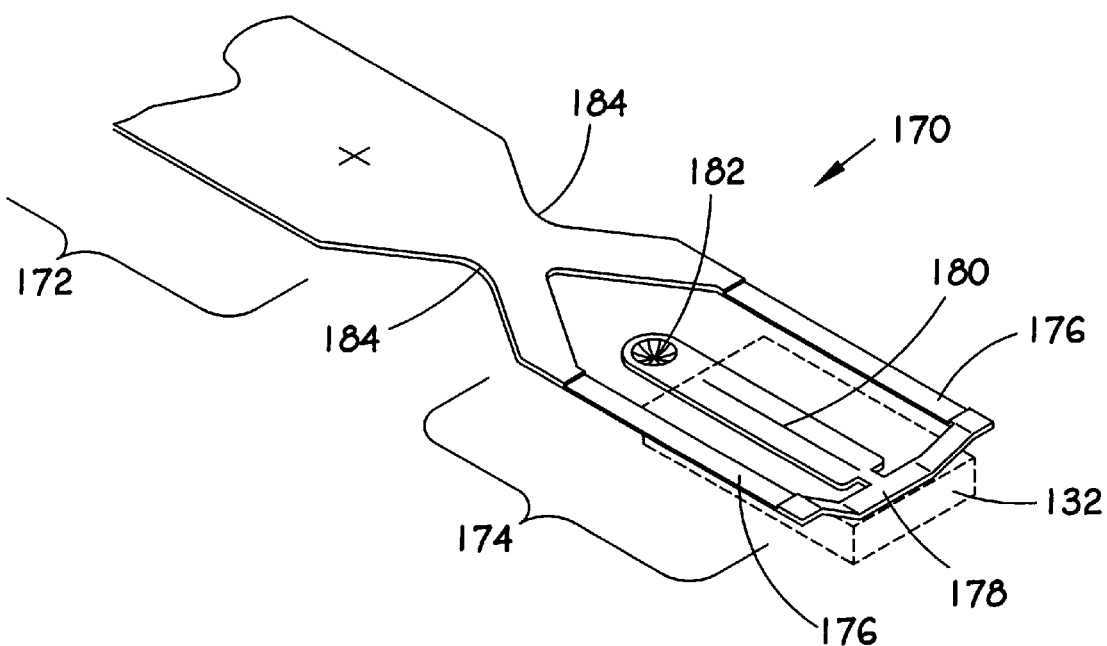
FIG. 5 is a detail partial perspective view of a gimbal including a first embodiment of the modification of the present invention.
Figure 6:
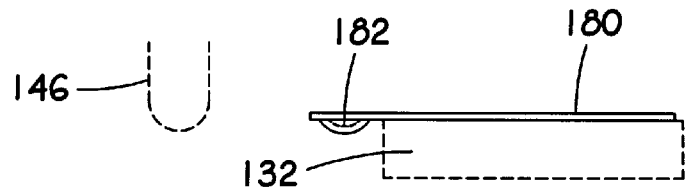
FIG. 6 is a detail side elevation view of a portion of the gimbal of FIG. 5.

Turning now to FIGS. 5 and 6, shown is partial perspective view of a gimbal element 170 which forms a portion of a head suspension and represents a first embodiment of the present invention. The gimbal element 170 is intended for attachment to a load beam, such as the load beam 136 of FIGS. 2, 3 and 4, by welding of an attachment portion 172 to the lower side of the load beam. The gimbal element 170 also includes a head mounting and gimbal portion 174, which in turn can be seen to include a laterally disposed pair of gimbal beams 176, which provide compliance of the entire head suspension assembly in the roll and pitch axes of the head assembly, and a slider mounting portion 178, similar to the slider mounting portion 156 of FIG. 4, to which a head assembly, represented by dashed lines at 132, is adhesively attached. The figure also shows that the slider mounting portion 178 is vertically displaced from the gimbal beams 176. Since the gimbal element is intended to be welded to the lower surface of a load beam portion of a head suspension, this vertical displacement is sufficient to cause the load point button 152 to contact the gimbal element 170 in a cooperative manner, as will be described below.

A comparison of the prior art gimbal elements 134 of FIGS. 2 and 4 with the inventive gimbal element 170 of FIG. 5 reveals that the inventive gimbal element 170 includes an extension tab 180 which extends longitudinally from the slider mounting portion 178 back over and beyond the location of the head assembly 132 to be mounted. The far distal end of the extension tab 180 includes a gimbal ramp contact feature in the form of a stamped dimple 182. This extension of the extension tab 180 beyond the extreme extent of the associated head assembly 132 is, perhaps, most clearly seen in FIG. 6, from an examination of which it is clear that the dimple 182 in the extension tab 180 is thus positioned between the leading edge of the head assembly 132 and the load beam ramp contact feature, the relative position of which is shown in dashed lines at 146.

The load point button (152 in FIG. 3) of the associated load beam portion of the head suspension assembly will directly contact the extension tab 180 when the gimbal element 170 is welded to the lower surface of a load beam (136 in FIGS. 2 and 3) due to the vertical displacement of the slider mounting portion 178 from the remainder of the gimbal element 170.

The specific configuration shown in FIG. 5 is intended for use with a load beam similar to that of FIG. 3, i.e., a load beam which includes a primary ramp contact feature (146 in FIG. 3) and a secondary ramp contact feature (154 in FIG. 3) acting as the principal lifting means for an entire head suspension assembly, and therefore also includes a pair of notches 184 to accommodate these load beam ramp contact features 146, 154. Embodiments of the present invention, which do not include such load beam ramp contact features, will be discussed below.

The dimple 182 of the extension tab 180 of the gimbal element 170 is intended to cooperate with a ramp structure, to be described below, to directly lift the head assembly 132 simultaneously with the principal lifting of the entire head/ head suspension assembly by the load beam ramp contact features 146, 154. That is, as the actuator of the disc drive moves the head/head suspension assemblies outward relative to the discs, the primary and secondary load beam ramp contact features (146, 154 in FIG. 3) will interact with a cooperative ramp structure to begin lifting the entire head/ head suspension assembly upward away from the disc. Substantially simultaneously with this contact, the dimple 182 on the extension tab 180 of the gimbal element 170 will contact a second portion of the ramp structure, and directly lift the head assembly 132 upward out of cooperation with the disc. Thus, any tendency of the head assembly 132 to remain in operative relationship with the disc—as, for instance, due to the action of a NPABS slider configuration—is countered by the direct lifting of the gimbal element 170 with the head assembly 132 attached.

Figure 11:
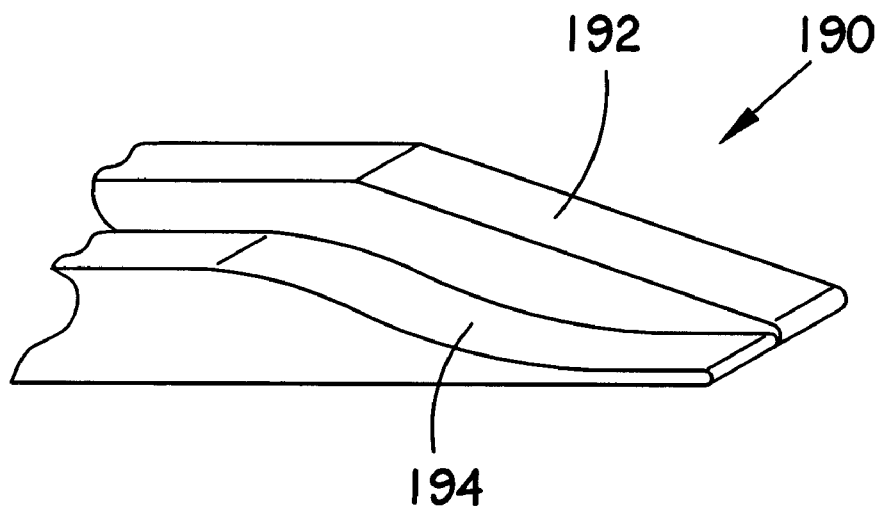
FIG. 11 is a simplified detail view of a portion of a novel ramp structure useful with certain embodiments of the present invention.

A specially configured ramp structure 190 for accomplishing the unloading and loading of the head assemblies in a disc drive incorporating the first embodiment of the present invention is shown in FIG. 11. In FIG. 11, the ramp structure 190 can be seen to include a load beam ramp surface 192—intended for cooperation with the load beam ramp contact features (146, 154 in FIG. 3)—and a gimbal ramp surface 194—intended for cooperation with a gimbal ramp contact feature, such as the dimple 182 of FIG. 5. One of skill in the art will appreciate that the vertical dimension in FIG. 11 has been greatly exaggerated for illustrative purposes, and that the actual amount of vertical displacement provided by the ramp structure 190 will be only that amount of vertical displacement necessary to disengage the head assembly from its cooperative relationship with the associated disc.

An examination of the elements of FIGS. 3, 5 and 11 will reveal that, when a head/head suspension assembly made in accordance with the first embodiment of the present invention is brought into proximity to the ramp structure of FIG. 11, the load beam ramp contact features (146, 154 in FIG. 3) will contact the load beam ramp surface 192, and the gimbal ramp contact feature, such as the dimple 182 of FIG. 5, will contact the gimbal ramp surface 194, causing the head assembly (132 in FIG. 5) to be controllably lifted away from the disc.

Figure 9:
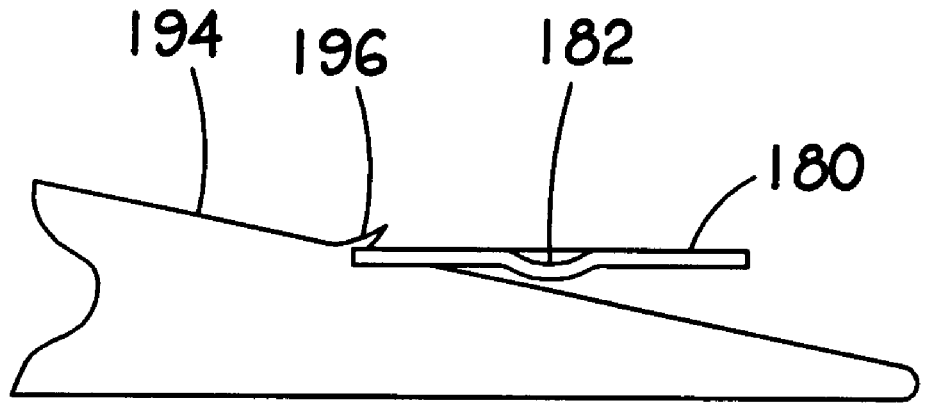
FIG. 9 is a simplified diagrammatic detail view of potential drawbacks of specific component relationships.

One potential drawback of the gimbal element configuration of FIG. 5 is illustrated in FIG. 9. FIG. 9 is a simplified diagrammatic sectional elevation view of an extension tab 180, including a dimple 182, in cooperation with a gimbal ramp surface 194. In FIG. 9, the gimbal ramp surface 192 is shown as linear for illustrative purposes.

FIG. 9 shows that the lateral extreme (not separately designated) of the extension tab 180 can, dependent on the slope of the gimbal ramp surface 194, contact the gimbal ramp surface 194 before the dimple 182, and that the sharp edge of the extension tab 180 can thus gouge into the gimbal ramp surface, as shown at 196. Such undesirable contact can result in the failure of the ramp structure to function, or the generation of contaminating particles within the disc drive. Therefore, a second embodiment of the present invention which prevents such damaging contact will be presented below.

Figure 7:
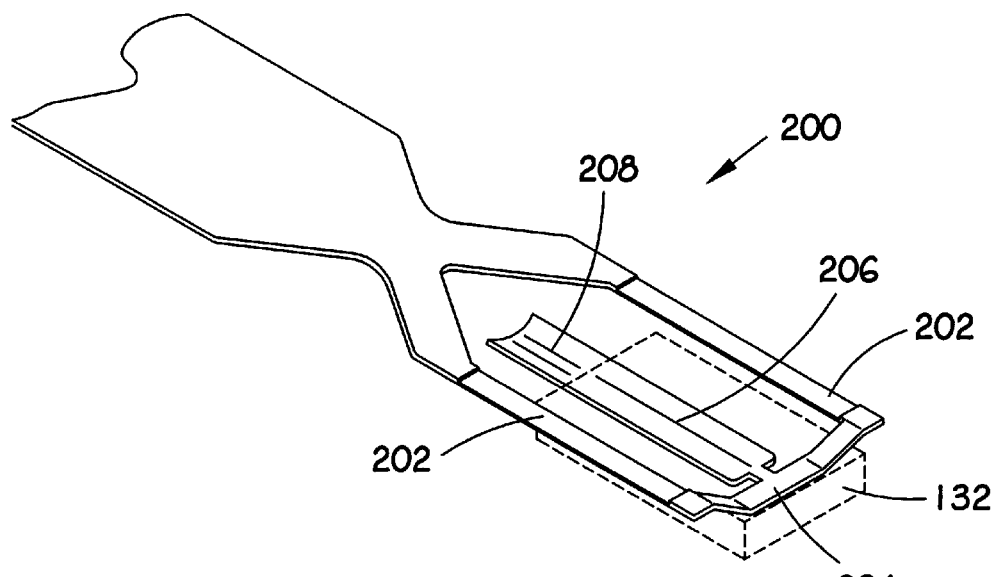
FIG. 7 is a detail partial perspective view of a gimbal including a second embodiment of the modification of the present invention.
Figure 8:
FIG. 8 is a detail side elevation view of a portion of the gimbal of FIG. 7.

FIGS. 7 and 8 are partial perspective and simplified diagrammatic elevation views, respectively, of a second embodiment of a gimbal element 200. As can be seen in the figures, the gimbal element 200 includes a pair of laterally disposed gimbal beams 202, a slider mounting portion 204 to which a head assembly 132 is adhesively attached, and an extension tab 206 which extends from the slider mounting portion 204 back over the head assembly 132, all similar to the first embodiment of FIGS. 5 and 6.

The gimbal element 200 also includes a gimbal ramp contact feature in the form of a partial cylinder, or "half-tube" 208. It should be noted that the descriptive phrases "partial cylinder" and "half-tube" are only generally descriptive, and that the actual crosssection of the half-tube 208 need not be perfectly cylindrical, nor need it be limited to an exact half of a tubular member. The designation of half-tube is intended, rather to define a general shape which is curved upward at its lateral extremes, as shown in the figures, and as will be described in more detail below.

As can most clearly be seen in the simplified diagrammatic sectional elevation view of FIG. 8, the "half-tubular" gimbal ramp contact feature 208 is located between the leading edge of the head assembly 132 and the load beam ramp contact feature, the relative location of which is represented in dashed lines at 146.

Figure 10:
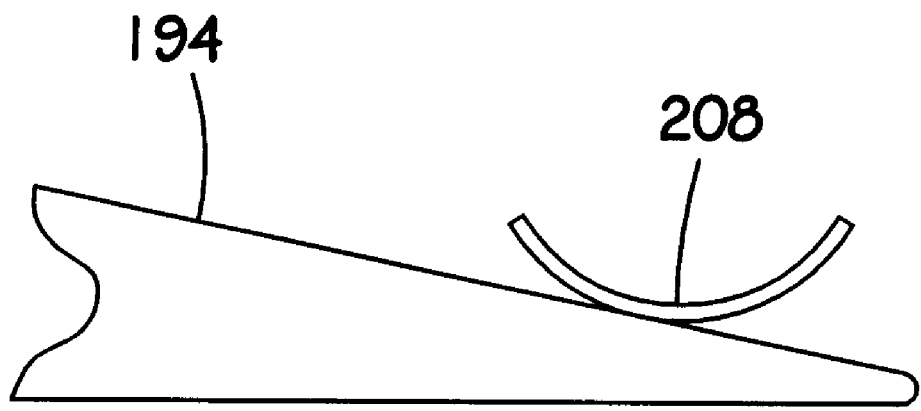
FIG. 10 is a simplified diagrammatic detail view showing the advantages of the gimbal configuration of FIGS. 7 and 8.

The advantage of the configuration of the gimbal ramp contact feature 208 of FIGS. 7 and 8 over the configuration shown in FIGS. 5 and 6 can best be seen in FIG. 10, which is a simplified diagrammatic sectional elevation view, similar to FIG. 9, showing a "half-tubular" gimbal ramp contact feature 208 in cooperation with a gimbal ramp surface 194. As is apparent in the figure, due to the upward curving lateral extremes of the gimbal ramp contact feature 208, no potentially "gouging" contact can occur between the gimbal ramp contact feature 208 and the gimbal ramp surface 194.

Again, if it is envisioned that a head/head suspension assembly incorporating the gimbal element 200 of FIGS. 7 and 8 is utilized in cooperation with the ramp structure of FIG. 11, it will be apparent that contact between the load beam ramp contact feature 146 and the load beam ramp surface 192, and between the gimbal ramp contact feature 208 and the gimbal ramp surface 194 will result in controlled lifting of the head assembly 132 away from cooperative engagement with the disc, and that any tendency of the head assembly 132 to remain "stuck" to the disc will be countered by the direct lifting of the head assembly 132 via the gimbal ramp contact feature 208.

It is also envisioned by the present invention that it may be possible to provide the advantages of the present invention without utilizing the load beam ramp contact features (146, 154 in FIG. 3).

Figure 13:
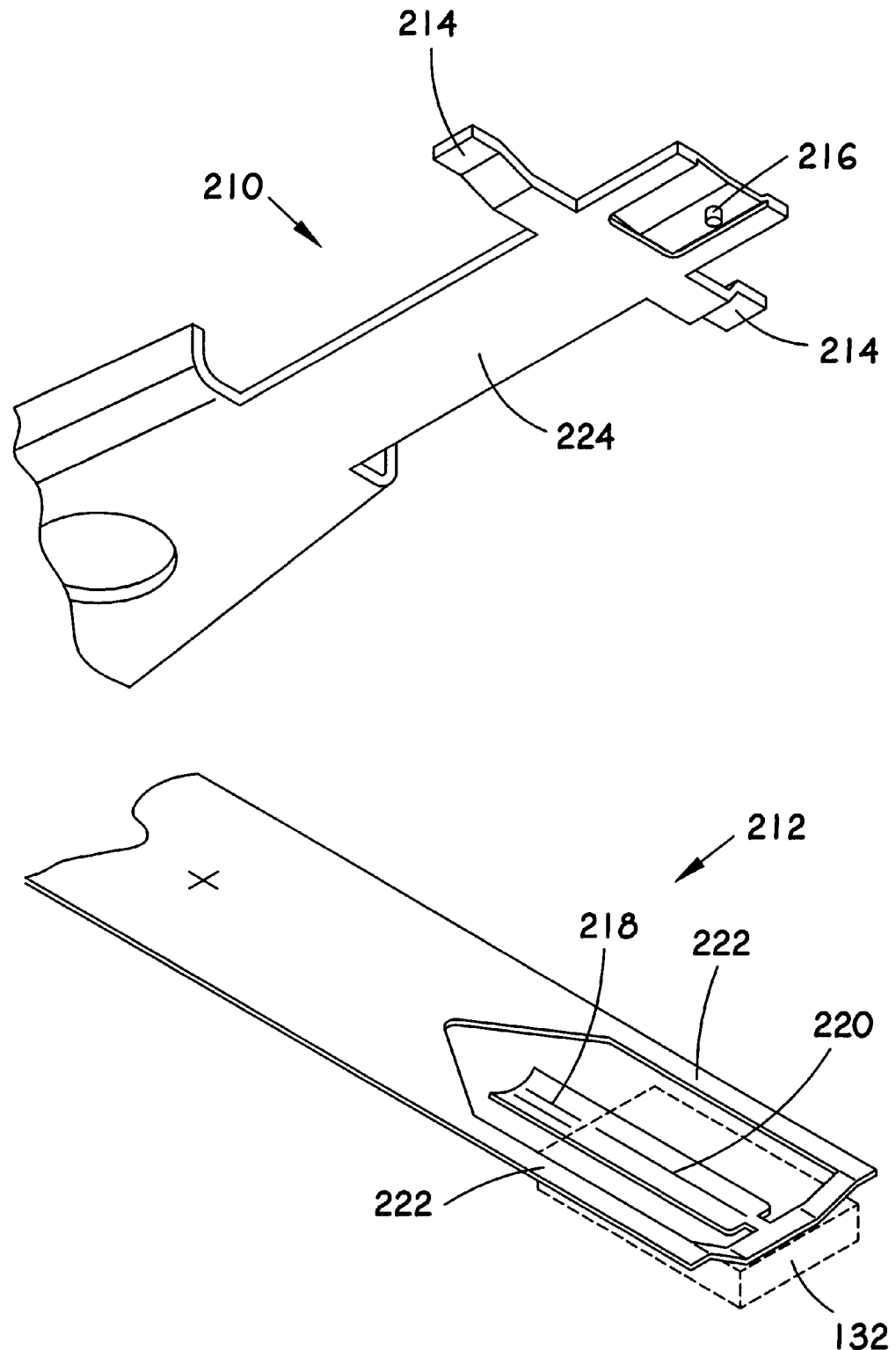
FIG. 13 is an exploded perspective view of a load beam and gimbal element combination of another embodiment of the present invention.

FIG. 13 is an exploded perspective view of a load beam element 210 and a gimbal element 212 of another embodiment of the present invention. FIG. 13 specifically shows the lower side of the load beam element 210 and the upper side of the cooperative gimbal element 212.

The load beam element 210 is similar to that shown in FIG. 3. However, a careful comparison of FIG. 3 and FIG. 13 will show that the load beam element 210 of FIG. 13 includes gimbal displacement limiting features 214 which are formed in the opposite direction relative to the load point button 216 to those of FIG. 3, and that the load beam element 210 does not include load beam ramp contact features, such as those identified by numerical references 146 and 154 in FIG. 3.

The gimbal element 212 of FIG. 13 can be seen to be similar to that shown in FIGS. 7 and 8, except that it does not include notches (such as those identified with numerical references 184 in FIG. 5 for the accommodation of load beam ramp contact features.

These differences can be implemented since the embodiment of FIG. 13 envisions that the entire head lifting function will be performed by contact between the gimbal ramp contact feature 218 and a cooperative ramp structure. When the load beam element 210 and gimbal element 212 are welded together with the top surface of the gimbal element 212 contacting the lower surface of the load beam element 210, the load point button 216 of the load beam element 210 will be in contact with the top surface of the extension tab 220 at a location substantially centered on the head assembly 132.

The gimbal beams 222 will be located below the distal ends of the gimbal displacement limiting features 214. Lifting of the head assembly 132 away from the disc is accomplished by engagement of the gimbal ramp contact feature 218 and a cooperative ramp structure. When the gimbal ramp contact feature 218 engages the ramp structure, the head assembly 132 will be lifted away from the disc. Depending upon the load force generated by the spring portion (138 in FIG. 2) of the head suspension assembly, the lifting of the head assembly 132 may cause the gimbal beams 222 to contact the gimbal displacement limiting features 214 on the load beam element 210, and the upper surface of the gimbal ramp contact feature 218 to contact the lower surface of the load point tab 224 of the load beam element 210. However, any such displacement of the gimbal element 212 into contact with the load beam element 210 will be of insufficient magnitude to permanently distort or damage the gimbal element 212.

Figure 12:
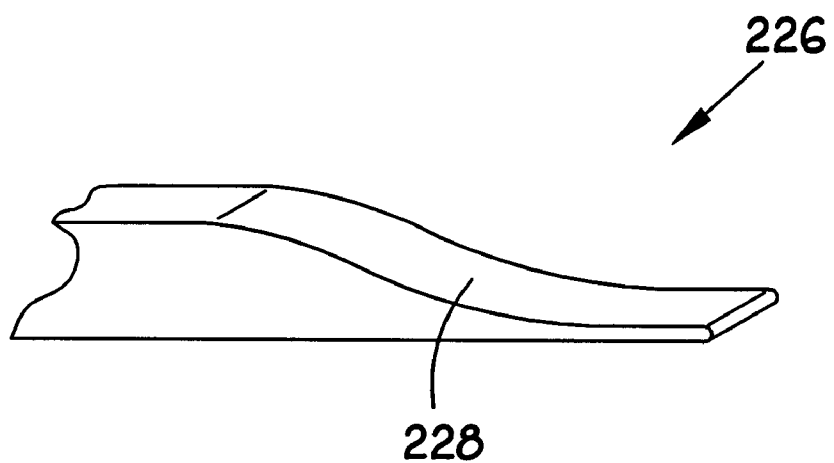
FIG. 12 is a simplified detail view of a portion of a second novel ramp structure useful with other embodiments of the present invention.

FIG. 12 shows a simplified perspective view of a ramp structure 226 suitable for use with the embodiment of FIG. 13. A comparison of the ramp structure 226 with the previously discussed ramp structure 190 of FIG. 11 reveals that the ramp structure 226 of FIG. 12 includes only a single gimbal ramp surface 228, intended for cooperative engagement with the gimbal ramp contact feature 218. Thus, the embodiment of FIG. 13 allows the use of a less complex ramp structure than do the embodiments previously described.

Figure 14:
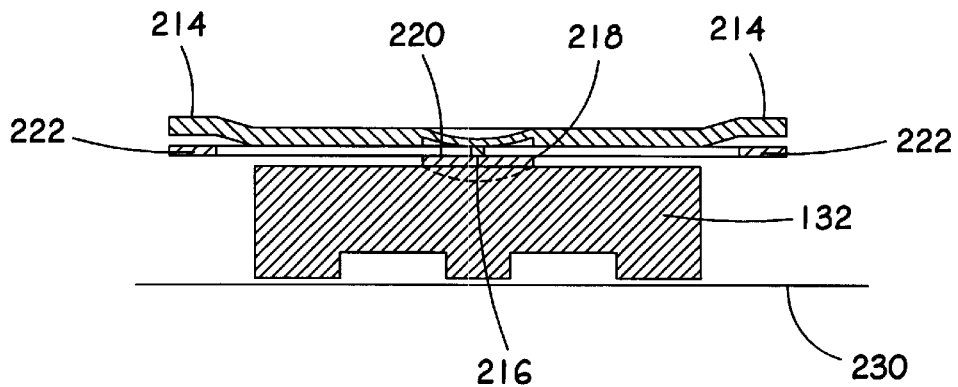
FIG. 14 is an end sectional elevation view of a head/head suspension assembly made in accordance with the embodiment of FIG. 13.
Figure 15:
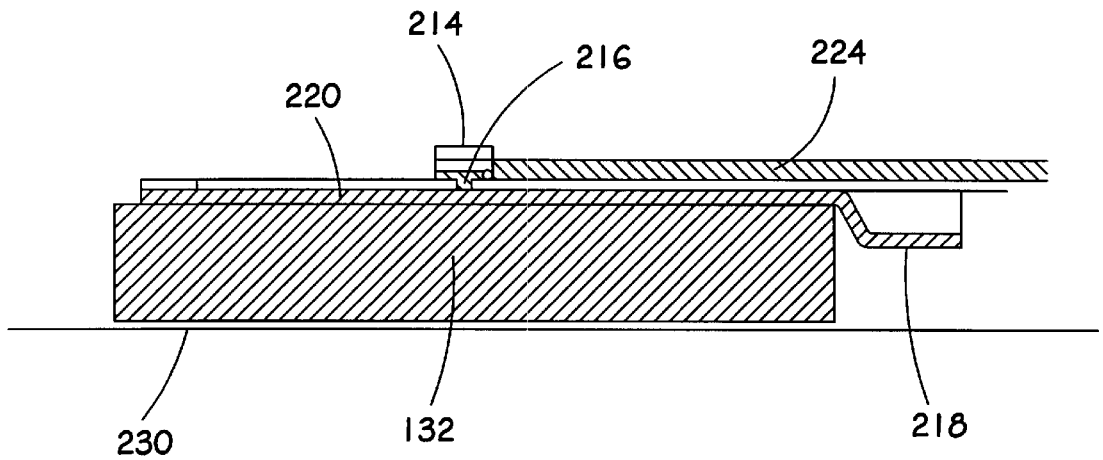
FIG. 15 is a side sectional elevation view of a head/head suspension assembly made in accordance with the embodiment of FIG. 13.

FIGS. 14 and 15 are sectional end and side elevation views, respectively, of a head/head suspension assembly made in accordance with the embodiment of FIG. 13, and intended for use with a ramp structure similar to that shown in FIG. 12.

FIGS. 14 and 15 show a head assembly 132 in cooperative engagement with a disc surface 230, and both sectional views are taken on planes passing substantially through the center of the load point button 216. The figures show that the extension tab 220 lies in contact with the upper surface of the head assembly 132, that the gimbal beams 222 are laterally disposed on either side of the head assembly 132, that the load point button 216 of the load beam element (210 in FIG. 13) is in contact with the upper surface of the extension tab 220, and that the gimbal beams lie beneath the gimbal displacement limiting features 214 during normal disc drive operation.

If it is envisioned that the gimbal ramp contact feature 218 engages a ramp structure, such as the ramp structure 226 of FIG. 12, it is evident that the head assembly 132, which adhesively attached to the extension tab 220, will be lifted away from the disc surface 230 as the gimbal contact feature 218 is moved up the ramp structure. Further, it is also apparent from the figures that any displacement of the gimbal element (212 in FIG. 13) relative to the load beam element (210 in FIG. 13) will be limited by contact between the gimbal beams 222 and the gimbal displacement limiting features 214, and between the upper surface of the gimbal ramp contact feature 218 and the lower surface of the load point tab 224.

Thus the present invention provides a system for unloading the heads from and loading the heads into cooperative engagement with discs in a disc drive. Because the present invention envisions that lifting of the heads will be accomplished by contact between a ramp structure and a contact feature in fixed relationship with the head, the present invention serves to prevent damaging stresses on the delicate gimbal element of the head suspension, even when the head being lifted tends to be held in proximity to the disc by the action of a negative pressure air bearing surface (NPABS) slider assembly.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A disc drive including one or more discs mounted for rotation on a spindle motor, an array of vertically aligned head assemblies each mounted to and supported by a head suspension for cooperative operation with the discs and a plurality of ramp structures fixedly located near the outer diameters of the discs, the head suspensions each including a gimbal portion fixedly attached to a load beam portion, the gimbal portion further including an extension tab substantially coplanar with and extending from a slider mounting portion of the gimbal portion, the extension tab further comprising a gimbal ramp contact feature extending beyond the head assembly for contact with the ramp structures.

2. A disc drive as claimed in claim 1 wherein the ramp structures include gimbal ramp contact surfaces for cooperation with the gimbal ramp contact features.

3. A disc drive as claimed in claim 2 wherein the load beam portions include load beam ramp contact features, and wherein the ramp structures further include load beam ramp contact surfaces.

4. A system for unloading heads from and loading heads into cooperative engagement with surfaces of discs in a disc drive, comprising:

ramp structures fixedly located adjacent outer diameters of the discs, and head suspensions for mounting and supporting the heads, the head suspensions each comprising:
    a load beam element, and
    a gimbal element, the gimbal element further comprising an extension tab substantially coplanar with and extending from a slider mounting portion of the gimbal portion, the extension tab further comprising a gimbal ramp contact feature extending beyond the head for contact with the ramp structures.

5. A system for unloading heads from and loading heads into cooperative engagement with surfaces of discs in a disc drive, as claimed in claim 4, wherein the ramp structures include gimbal ramp contact surfaces for cooperation with the gimbal ramp contact features.

6. A system for unloading heads from and loading heads into cooperative engagement with surfaces of discs in a disc drive, as claimed in claim 5, wherein the load beam portions include load beam ramp contact features, and wherein the ramp structures further include load beam ramp contact surfaces.

7. A disc drive including one or more discs mounted for rotation on a spindle motor, an array of vertically aligned heads, each mounted to and supported by a head suspension for cooperative operation with the discs, and means for unloading the heads from and loading the heads into cooperative engagement
  with surfaces of the discs.

* * * * *